(12) United States Patent
Treister et al.

(10) Patent No.: US 7,310,661 B2
(45) Date of Patent: Dec. 18, 2007

(54) APPROACH FOR TRANSFERRING FUNCTIONS BETWEEN PARTICIPANTS IN A COMMUNICATIONS ARRANGEMENT

(75) Inventors: Bijan Treister, Kew (AU); Hongbing Gan, Carlton North (AU); Efstratios Skafidas, Coburg (AU)

(73) Assignee: Bandspeed, Inc., Austin, TX (US)

( * ) Notice: Subject to any disclaimer, the term of this patent is extended or adjusted under 35 U.S.C. 154(b) by 858 days.

(21) Appl. No.: 09/939,105

(22) Filed: Aug. 24, 2001

(65) Prior Publication Data

US 2002/0098841 A1      Jul. 25, 2002

Related U.S. Application Data

(60) Provisional application No. 60/264,348, filed on Jan. 25, 2001.

(51) Int. Cl.
    *G06F 15/16*      (2006.01)
(52) U.S. Cl. ......................... 709/208; 709/227
(58) Field of Classification Search .................... None
    See application file for complete search history.

(56) References Cited

U.S. PATENT DOCUMENTS

| | | |
|---|---|---|
| 4,716,573 A | 12/1987 | Bergstrom et al. |
| 4,780,885 A | 10/1988 | Paul et al. |
| 5,317,568 A * | 5/1994 | Bixby et al. ................ 370/401 |
| 5,323,447 A | 6/1994 | Gillis et al. |
| 5,394,433 A | 2/1995 | Bantz et al. |
| 5,418,839 A | 5/1995 | Knuth et al. |
| 5,541,954 A | 7/1996 | Emi |
| 5,574,979 A | 11/1996 | West |
| 5,649,291 A * | 7/1997 | Tayloe ........................ 370/332 |
| 5,726,978 A | 3/1998 | Frodigh et al. |
| 5,774,808 A | 6/1998 | Särkioja et al. |
| 5,781,861 A | 7/1998 | Kang et al. |
| 5,844,522 A * | 12/1998 | Sheffer et al. .............. 342/457 |
| 5,873,036 A * | 2/1999 | Vucetic ..................... 455/439 |
| 5,898,928 A | 4/1999 | Karlsson et al. |

(Continued)

FOREIGN PATENT DOCUMENTS

WO      WO 00/60896      10/2000

OTHER PUBLICATIONS

IEE Proc.-Commun., Vol. 142, No. 2, Apr. 1995, entitled "Adaptive frequency hopping in HF communications", by J. Zander, PhD and G. Malmgren, MSc, (pp. 99-105).

(Continued)

*Primary Examiner*—John B. Walsh
(74) *Attorney, Agent, or Firm*—Hickman Palermo Truong & Becker

(57) ABSTRACT

A novel approach for transferring management functions between participants generally involves the use of an associate master participant that assumes responsibilities for functions assigned to the master participant if the master participant can no longer perform the functions. A participant in a communications arrangement is designated as the master participant and is responsible for performing one or more functions. Another participant from the communications arrangement is designated as an associate master participant. The associate master participant assumes the role of master participant, i.e., performs the functions previously assigned to master participant, if any of a set of handoff criteria are satisfied. The particular handoff criteria used may vary depending upon the requirements of a particular application and the invention is not limited to any particular handoff criteria. After associate master participant assumes the role of master participant, a new associate master participant may be designated. The approach reduces the amount of time required both to determine that the master participant can no longer perform the functions and to assign responsibility for performing the functions to another participant once that determination is made.

42 Claims, 11 Drawing Sheets

U.S. PATENT DOCUMENTS

| | | | |
|---|---|---|---|
| 5,956,642 | A | 9/1999 | Larsson et al. |
| 6,009,332 | A | 12/1999 | Haartsen |
| 6,169,761 | B1 | 1/2001 | Marcoccia et al. |
| 6,240,126 | B1 | 5/2001 | Ohashi et al. |
| 6,549,784 | B1 | 4/2003 | Kostic et al. |
| 6,601,101 | B1 * | 7/2003 | Lee et al. .................. 709/227 |
| 6,633,761 | B1 * | 10/2003 | Singhal et al. ............. 455/436 |
| 6,650,872 | B1 | 11/2003 | Karlsson |
| 6,687,239 | B1 | 2/2004 | Koprivica |
| 6,694,147 | B1 | 2/2004 | Viswanath et al. |
| 6,700,875 | B1 | 3/2004 | Schroeder et al. |
| 6,704,346 | B1 | 3/2004 | Mansfield |
| 6,745,034 | B2 * | 6/2004 | Wang et al. ................ 455/441 |
| 6,760,317 | B1 | 7/2004 | Honkanen |
| 6,975,603 | B1 | 12/2005 | Dicker et al. |
| 2002/0122462 | A1 | 9/2002 | Bantra et al. |
| 2005/0223115 | A1 * | 10/2005 | Hanson et al. ............. 709/245 |

OTHER PUBLICATIONS

Fifth International Symposium on Signal Processing and its Applications, ISSPA '99 Brisbane, Australia, Aug. 22-25, 1999, entitled "Multiuser OFDM", by E. Lawrey, (pp. 761-764).

Walter L. Davis, A MAC Layer submission for the High Rate 802.15.3 Standard, Project: IEEE P802.15 Working Group for Wireless Personal Area Networks (WPANs), Sep. 2000, XP 002220853, pp. 1-57.

Jeyhan Karaoguz, "Multi-Rate QAM Physical Layer (8-40 Mbps) Proposal for High Rate WPAN," Project: IEEE P802.15 Working Group for Wireless Personal Area Networks (WPANs), Oct. 20, 2000, XP002220854, pp. 1-39.

Martin Johnson, "HiperLAN/2—The Broadband Radio Transmission Technology Operating in the 5 GHz Frequency Band," pp. 1-22, 1999.

European Patent Office"Communication pursuant to Article 96(2) EPC," Jun. 22, 2004, 5 pages.

"Clean Version of Amended Claims for Response to Official Comm. From Patent Examiner," EPO Patent Application No. 02709170.1, pp. 1-15.

Gan et al., "Adaptive Frequency Hopping Implementation Proposals for IEEE 802.15.1/2 WPAN," Bandspeed Pty Ltd., Nov. 2000, pp. 1-28.

Lawrey, Eric et al., "Adaptive Frequency Hopping for Multiuser OFDM," Second International Conference on Information, Communications & Signal Processing, ICICs'99, Dec. 7-10, 1999, pp. 1-5.

Zander, J. et al., "Adaptive frequency hopping in HF communications," IEE Proc-Commun., Vol. 142, No. 2, Apr. 1995, pp. 99-105.

* cited by examiner

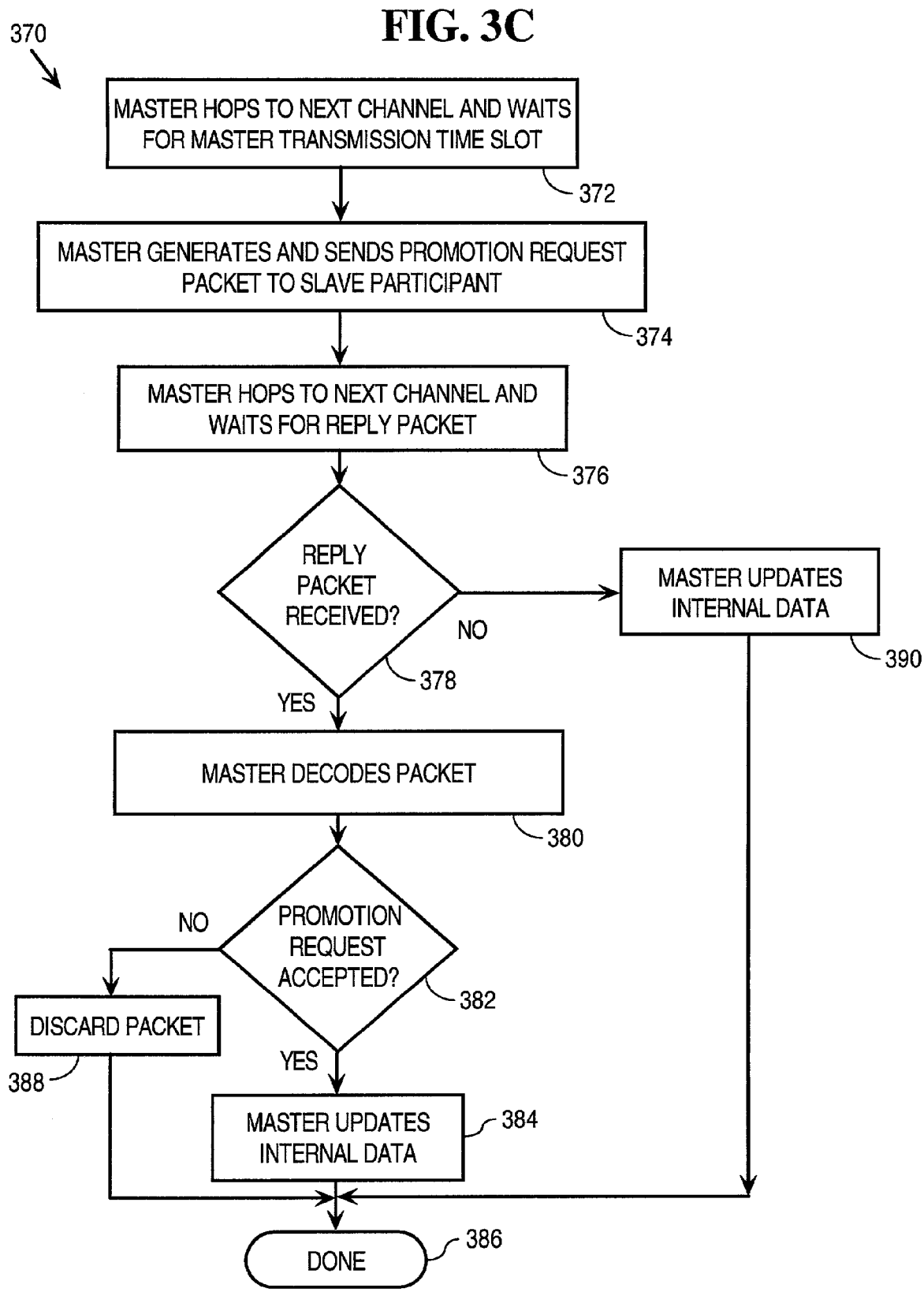

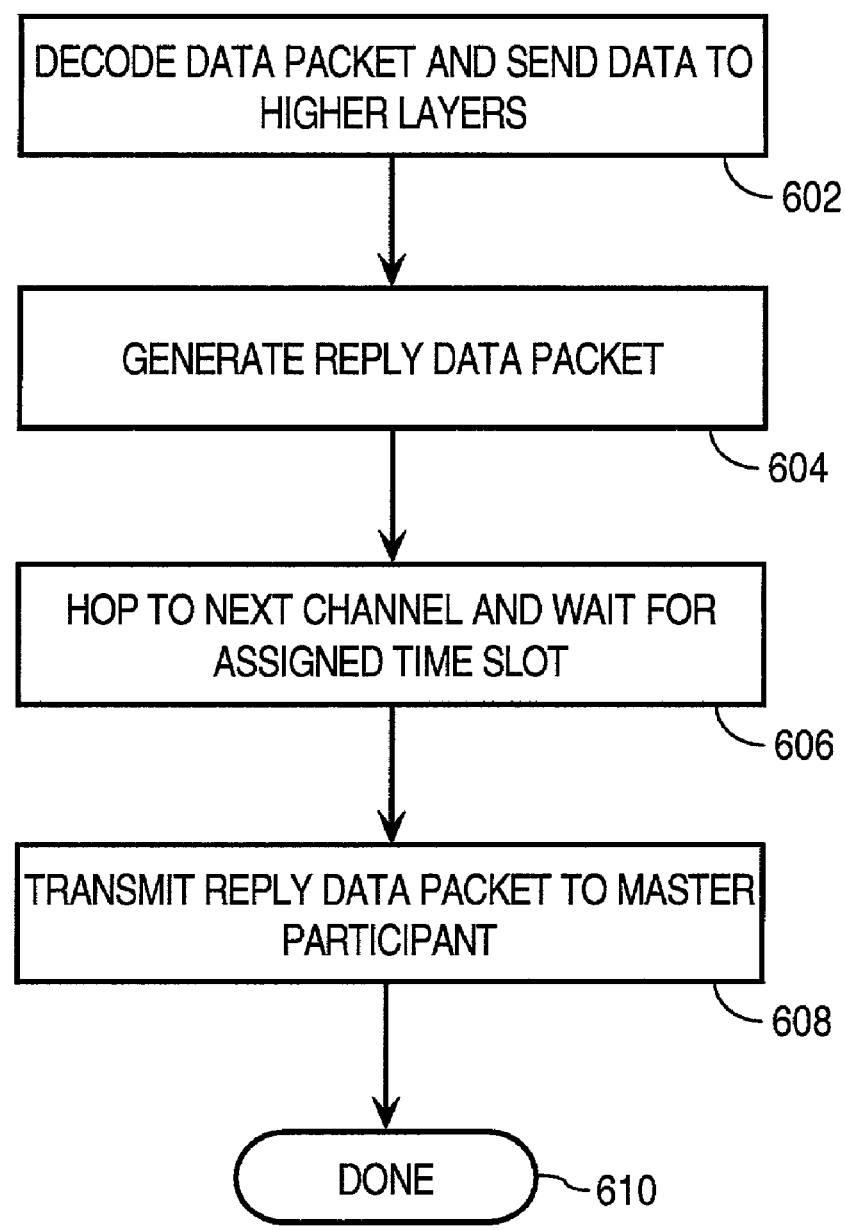

US 7,310,661 B2

APPROACH FOR TRANSFERRING FUNCTIONS BETWEEN PARTICIPANTS IN A COMMUNICATIONS ARRANGEMENT

RELATED APPLICATIONS

This application claims priority from U.S. Provisional Patent Application No. 60/264,348, entitled "A METHOD FOR ADAPTIVE NETWORK CONTROL," filed Jan. 25, 2001 by Bijan Treister, Hongbing Gan and Efstratios Skafidas, the contents of which are incorporated herein by reference in their entirety for all purposes. This application is related to U.S. patent application Ser. No. 10/052,019 entitled "APPROACH FOR MANAGING COMMUNICATIONS CHANNELS BASED ON PERFORMANCE AND TRANSFERRING FUNCTIONS BETWEEN PARTICIPANTS IN A COMMUNICATIONS ARRANGEMENT," filed on Jan. 16, 2002, by Bijan Treister, Hongbing Gan and Efstratios Skafidas.

FIELD OF THE INVENTION

The present invention relates to communications arrangements, and more specifically, to an approach for transferring management functions between participants in a communications arrangement.

BACKGROUND OF THE INVENTION

A communications network is any system or mechanism that provides for the exchange of information or data between participants. As used herein, the term "participant" refers to any device or mechanism that exchanges data with other devices or mechanisms over a communications medium. In some communications networks, one of the participants is designated as a master participant. The master participant performs one or more functions that are assigned to only the master participant and not to other participants. For example, a master participant may initiate and manage communications with other participants. As another example, the master participant may select a particular frequency hopping scheme to be used in the communications network. In communications networks with a master participant, the other participants are conventionally referred to as slave participants. Communications networks that use a master participant conventionally use only a single master participant, with any number of slave participants. Master participants are typically elected from available slave participants according to a selection or voting algorithm.

Using only a single master participant can have numerous drawbacks. In particular, if for any reason the master participant cannot perform its assigned functions, then the communications network will not function and the participants will not be able to communicate with each other. Master participant may not be able to perform their assigned functions for a variety of reasons. For example, in a wireless communications network with mobile participants, the master participant may move out of range of one or more slave participants, or vice versa. As another example, the master participant's power supply may drop below a minimum threshold or the master participant may otherwise fail. In any of these situations, the slave participants must first recognize that the master participant can no longer perform its assigned functions. Once the slave participants have made this determination, a new master participant must be selected from the available slave participants. Once the new master participant is selected, the functions assigned to the prior master participant must be assigned to the new master participant. Given that a master participant may fail at any time for a variety of reasons, either or both of these tasks may require a significant amount of time and computational resources and cause a significant disruption to the communications network.

Based on the need for wireless communications and the limitations in the conventional approaches, an approach for transferring management functions between participants that does not suffer from the limitations of the prior approaches is highly desirable.

SUMMARY OF THE INVENTION

According to one aspect of the invention, a method is provided for assigning functions between participants in a communications arrangement. The method includes assigning, to a first participant from the plurality of participants, one or more functions to be performed by the first participant. The method also includes prior to a failure of the first participant, designating a second participant from the plurality of participants to perform the one or more functions if any of one or more handoff criteria are satisfied. The method further includes in response to any of the one or more handoff criteria being satisfied, assigning the one or more functions to the second participant.

According to another aspect of the invention, a communications device is provided that comprises an interface and a mechanism. The interface is configured to receive data from a plurality of communications devices and to transmit data to other communications devices. The mechanism is configured to perform one or more functions, and prior to a failure of the communications device, designate a particular communications device from the plurality of communications devices to perform the one or more functions if any of a set of handover criteria are satisfied.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3C is a flow diagram that depicts an approach for a master participant to request that a slave participant assume the role of associate master participant, according to an embodiment of the invention;

FIG. 6A is a flow diagram that depicts example steps performed by an associate master participant or slave participant to process a data packet received from a master participant according to an embodiment of the invention;

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention. Various aspects of the invention are described hereinafter in the following sections: 1) Overview; 2) Network Initialization; 3) Master Participant; 4) Associate Master Participants; 5) Slave Participants; 6) Communications Between Associate Master Participants and Slave Participants and Master Participants; and 7) Implementation Mechanisms.

1. Overview

A novel approach for transferring management functions between participants generally involves the use of an associate master participant that assumes responsibilities for functions assigned to the master participant if the master participant can no longer perform the functions. The approach may be used with any type of functions and the invention is not limited to any particular type of functions. The approach reduces the amount of time required both to determine that the master participant can no longer perform the functions and to assign responsibility for performing the functions to another participant once that determination is made.

Figure 1A:
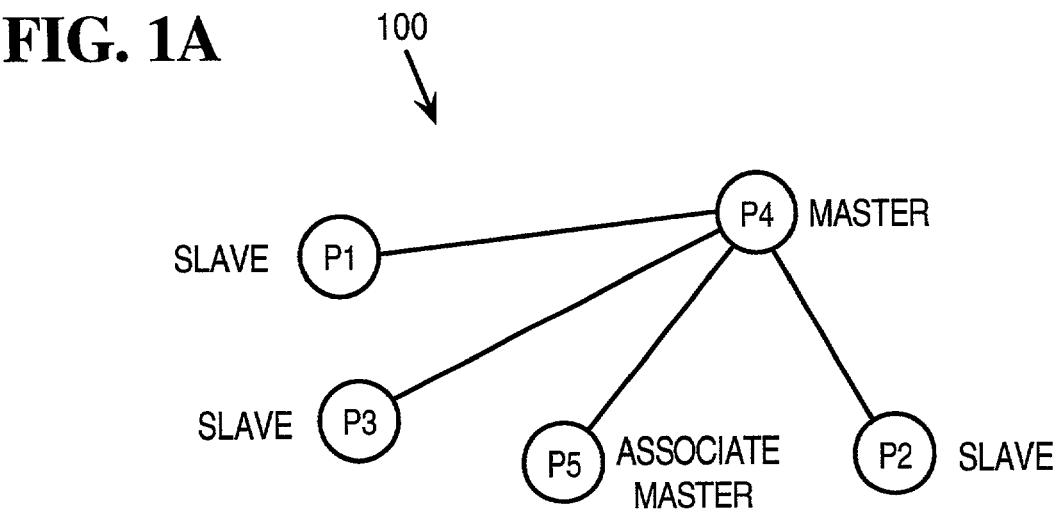
FIGS. 1A-1C are a set of block diagrams that depict various states of a communications arrangement during the transfer of management functions between participants according to an embodiment of the invention.
Figure 1B:
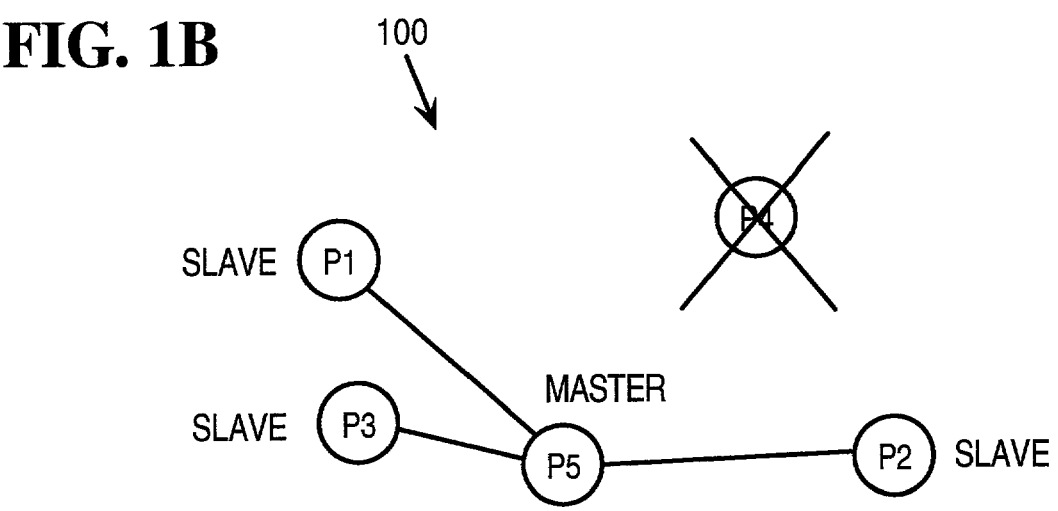
Figure 1C:
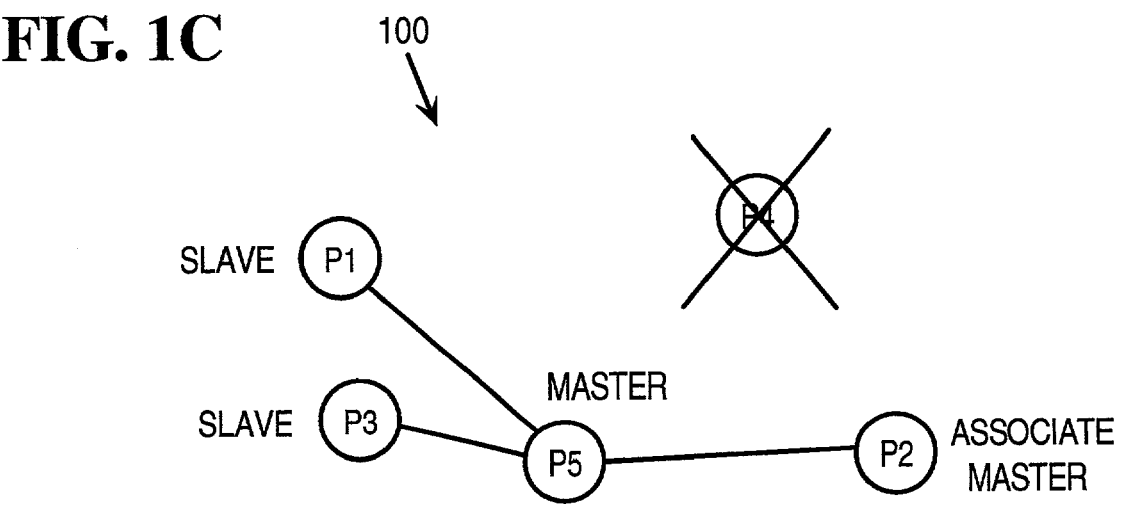

FIGS. 1A-1C are a set of block diagrams that depict various states of a communications arrangement 100 during the transfer of functions between participants according to an embodiment of the invention. Referring first to FIG. 1A, communications arrangement 100 includes participants P1-P5. Participant P4 is designated as the master participant and is responsible for performing one or more functions. An example function is initiating and managing communications with participants P2-P5. Master participant P4 may be elected from participants P1-P5 by participants P1-P5 or another entity and the invention is not limited to any particular approach for designating participant P4 as the master participant.

In accordance with an embodiment of the invention, participant P5 is designated as an associate master participant by master participant P4, slave participants P1-P3, or another mechanism or process. Associate master participant P5 may perform all of the functions of slave participants P1-P3. In addition, as illustrated in FIG. 1B, associate master participant P5 assumes the role of master participant, i.e., performs the functions previously assigned to master participant P4, if any of a set of handoff criteria are satisfied. The particular handoff criteria used may vary depending upon the requirements of a particular application and the invention is not limited to any particular handoff criteria.

One example handoff criteria is a request from the current master participant. Master participant P4 may know that it can no longer perform the assigned functions and requests associate master participant P5 to assume the role of the master participant. For example, master participant P4 may be a mobile device whose available power has fallen below a specified threshold. Alternatively, master participant P4 may know that it is moving out of range of one or more of the other participants or is experiencing a poor communications link between itself and one or more of the other participants.

Another example handoff criteria is a failure of master participant P4. Associate master participant P5 may be notified by other participants or another process or mechanism that master participant P4 has failed. Alternatively, associate master participant P5 may itself detect that master participant P4 has failed and assume responsibility for performing the functions. According to one embodiment of the invention, associate master participant P5 monitors data transmitted by master participant P4 and if master participant P4 has not made any communications within a specified period of time, then associate master participant P5 assumes that master participant P4 can no longer perform the functions of master participant, i.e., has failed, and associate master participant P5 assumes the role of master participant. Additional details of the functions and role of associate master participants are described in more detail hereinafter.

After associate master participant P5 assumes the role of master participant, a new associate master participant may be designated by the new master participant P5, the remaining slave participants P1-P3, or some other mechanism or process. As illustrated in FIG. 1C, participant P2 is designated as the new associate master participant.

2. Network Initialization

Figure 2:
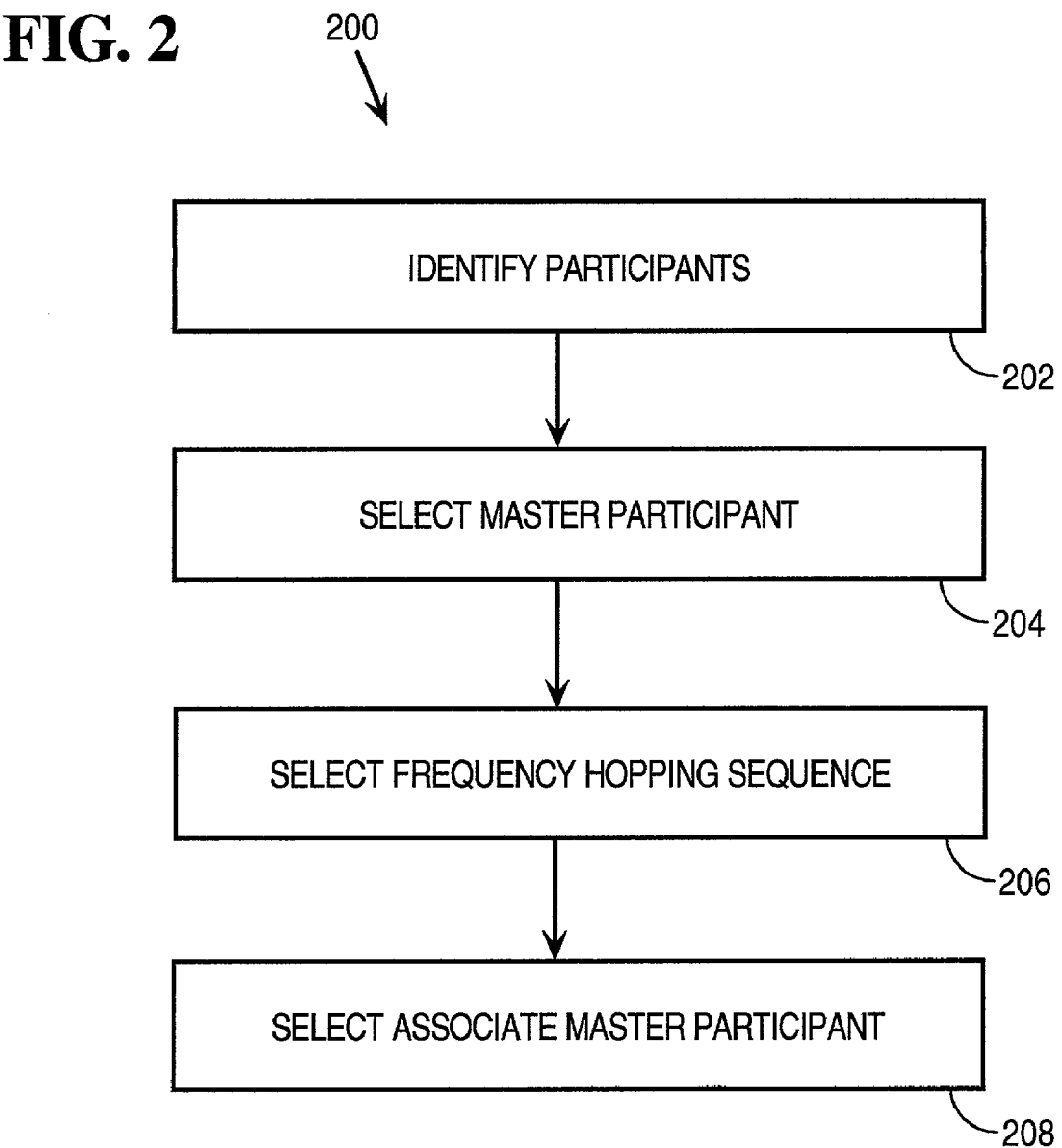
FIG. 2 is a flow diagram depicting an approach for initializing a communications arrangement that includes a master participant and an associate master participant according to an embodiment of the invention.

Communications networks conventionally perform an initialization procedure to identify and/or locate the participants and to elect a master participant. FIG. 2 is a flow diagram 200 depicting an approach for initializing a communications arrangement that includes a master participant and an associate master participant according to an embodiment of the invention. For purposes of explanation, embodiments of the invention are described hereinafter in the context of exchanging data between participants using data packets. Any type of data packet may be used and the invention is not limited to any particular data packet. For example, the data packets may include a preamble, header, payload and tail, alone or in any combination. Furthermore, embodiments of the invention are described in the context of frequency hopping where successive data packets are transmitted on different frequency channels and each participant transmits in an assigned time slot.

In step 202, participants P1-P5 are identified. In step 204, a master participant is selected according to a specified selection algorithm. In the present example, participant P4 is selected as the master participant, either by the other participants P1-P3 and P5, or by some other mechanism or process involved in the management of communications arrangement 100. In step 206, a frequency hopping sequence is selected. The invention is not limited to any particular frequency hopping sequence or approach for selecting the frequency hopping sequence. In step 208, an associate master participant is selected from the remaining participants P1-P3 and P5. In the present example, participant P5 is selected as the associate master participant. The selection of an associate master may be made by the remaining participants P1-P3, the master participant P4, or any type of selection mechanism that may be integrated into communications arrangement 100, or which may be separate from communications arrangement 100. The order in which steps 206 and 208 are performed may vary depending upon the requirements of a particular application. For example, the associate master participant may be selected before the frequency hopping sequence is selected.

Once communications arrangement 100 has been initialized, master participant P4 begins performing its assigned functions. Slave participants P1-P3 and associate master participant P5 perform functions as instructed by master participant P4 and also communicate with master participant P4. Associate master participant P5 may also perform periodic checks to determine whether master participant P4 can no longer perform its assigned functions and that associate master participant P5 is to assume the role of master participant P4.

3. Master Participant

Example functions performed by master participants are now described with reference to a flow diagram 300 of FIGS. 3A-3C. The three example functions described hereinafter are sending a normal data packet to a slave participant, requesting that an associate master participant assume the role of master participant and requesting that a slave participant assume the role of an associate master participant.

Figure 3A:
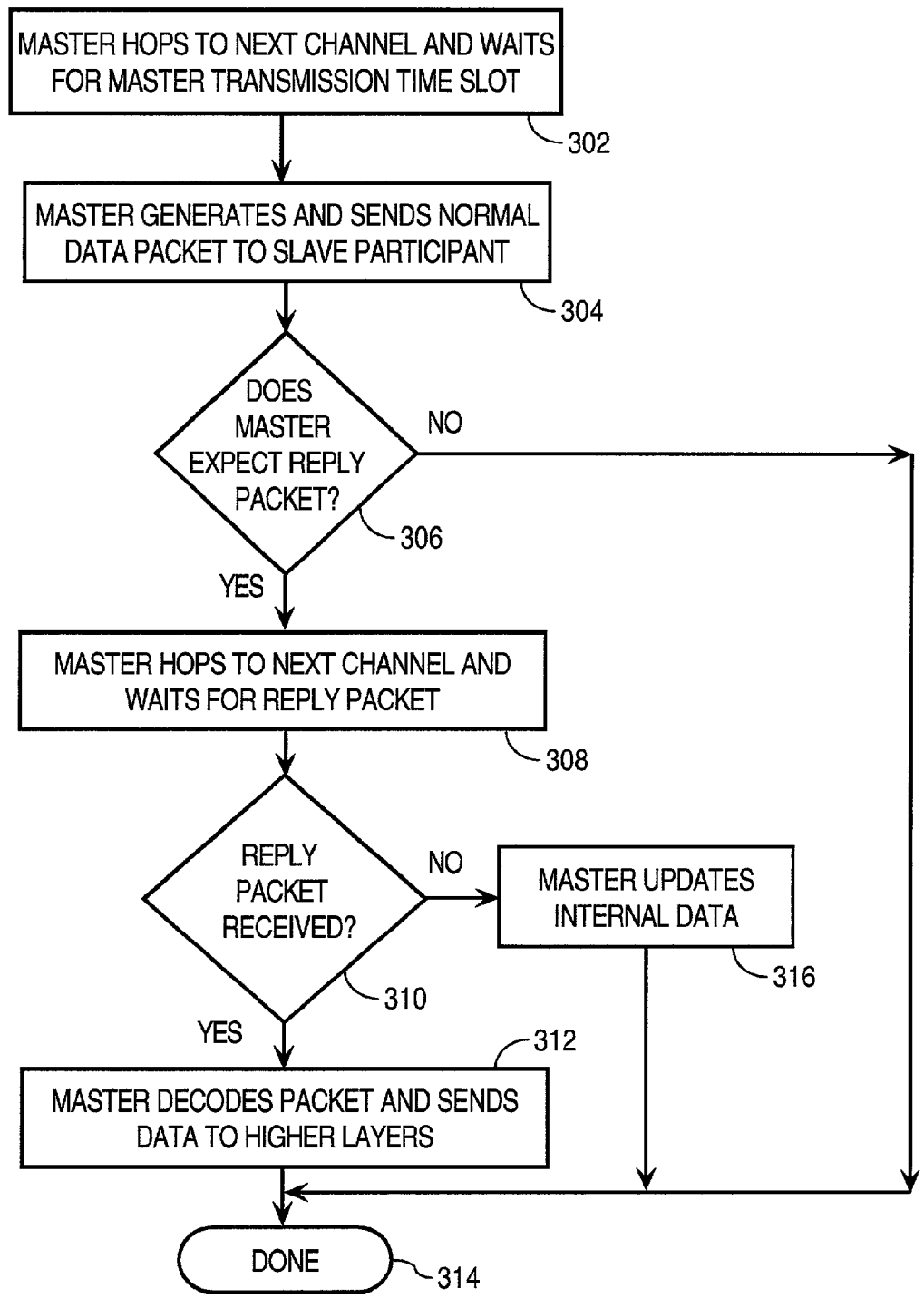
FIG. 3A is a flow diagram that depicts an approach for a master participant to send a normal data packet to a slave participant according to an embodiment of the invention.

FIG. 3A is a flow diagram 300 that depicts an approach for a master participant to send a normal data packet to a slave participant according to an embodiment of the invention. In step 302, the master participant hops to the next channel and waits for the master transmission time slot. As is conventional in time division multiple access protocols, each participant communicates during a particular period of time referred to as a time slot.

In step 304, the master participant generates and sends a normal data packet to a slave participant. In step 306, a determination is made whether the master expects a reply packet from the slave participant. If not, then the process is complete in step 314. If the master participant does expect a reply packet from the slave participant, then in step 308, the master participant hops to the next channel and waits to receive the reply packet from the slave participant.

If, in step 310, the reply packet is received from the slave participant, then in step 312, the master participant decodes the reply packet and sends data to higher layers as appropriate. The reply packet may contain data that is to be processed by a higher layer in the master participant device. One example of such data is performance data from the slave participant that indicates the quality of transmission from the master participant to the slave participant. The process is then complete in step 314.

If in step 310, the reply packet is not received, e.g., within a specified period of time, then in step 316, the master participant updates its internal data to reflect that a reply packet was not received from the slave participant and the process is complete in step 314.

Figure 3B:
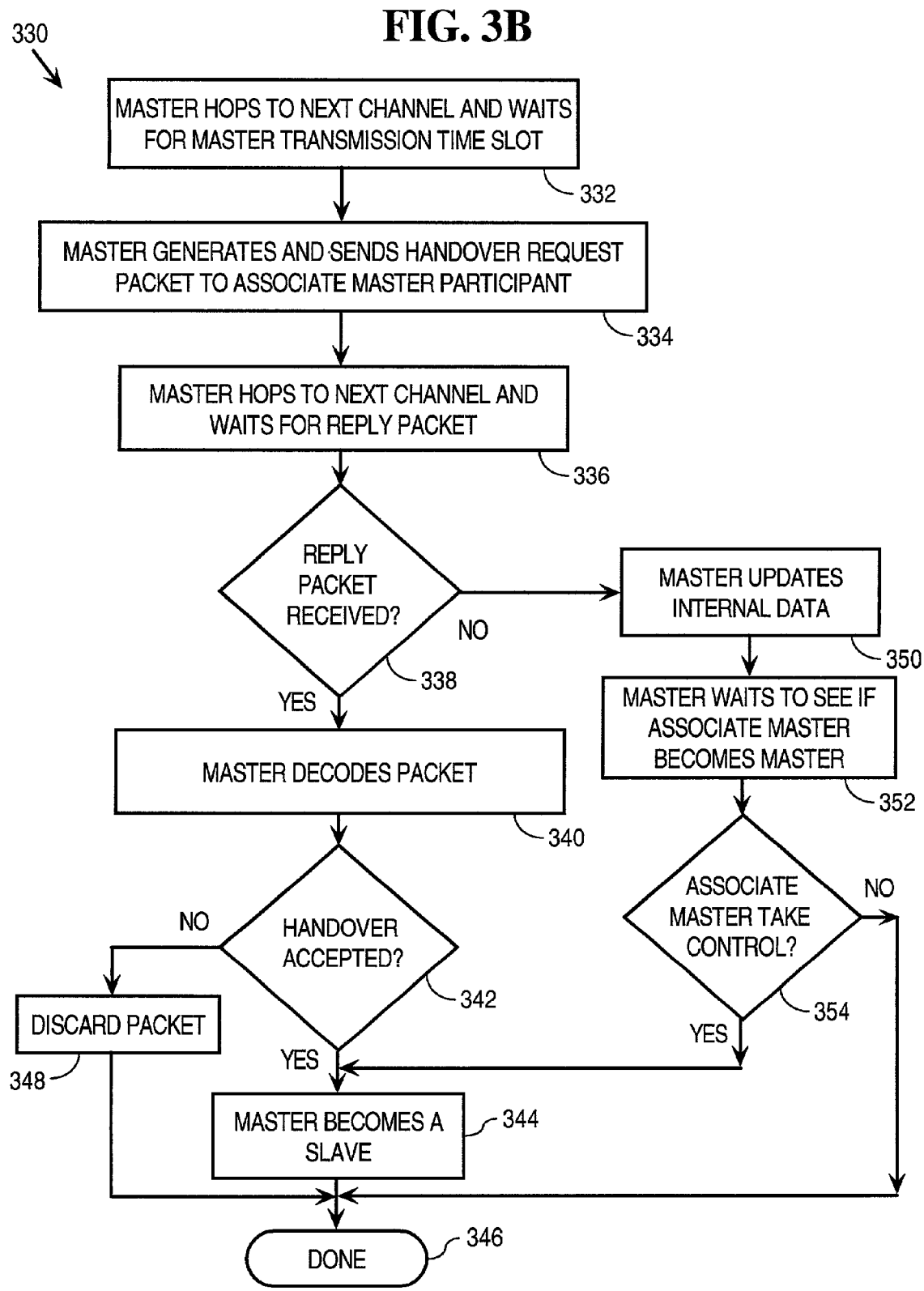
FIG. 3B is a flow diagram that depicts an approach for a master participant to request that an associate master participant assume the role of master participant, according to an embodiment of the invention.

FIG. 3B is a flow diagram 330 that depicts an approach for a master participant to request that an associate master participant assume the role of master participant, according to an embodiment of the invention. There may be a variety of reasons why the master participant may request that the associate master participant assume the role of the master participant and perform the functions assigned to the master participant. For example, the master participant's power level may have dropped below a specified threshold. As another example, the master participant may have moved out of range of one or more slave participants and can no longer adequately communicate with those slave participants. As yet another example, there may be a noise source that is interfering with communications between the master participant and one or more slave participants. The noise source may be in close proximity to the master participant, but not the associate master participant. Thus it is desirable for the associate master participant to assume the role of the master participant.

In step 332, the master participant hops to the next channel and waits for the master transmission time slot. In step 334, the master participant generates and sends to the associate master participant a handover request packet. The handover request packet contains data that represents a request for the associate master participant to assume the role of the master participant and perform the functions assigned to the master participant. In step 336, the master participant hops to the next channel and waits for a reply packet from the associate master. Note that in this situation, it is assumed that the master participant expects a reply packet from the associate master participant. In some applications, the master participant may not necessarily expect a reply packet from the associate master participant.

In step 338, a determination is made whether the master participant has received a reply packet from the associate master participant. If so, then in step 340, the master participant decodes the reply packet. Then, in step 342, the master participant determines, based upon the contents of the reply packet, whether the associate master participant has accepted the handover request. If so, then in step 344, the master participant becomes a slave participant and updates its internal state data accordingly. At this point, the master participant assumes that the associate master participant has taken the steps necessary to assume the role of the master participant and the process is complete in step 346.

If, in step 342, the master participant determines, based upon the contents of the reply packet, that the associate master participant has not accepted the handover request, then in step 348, the reply packet is discarded and the process is complete in step 346. In this situation, the associate master participant has affirmatively declined the request to become the master participant and the master participant may make another request at another time.

Returning to step 338, if the master participant does not receive a reply packet from the associate master participant, then in step 350, the master participant updates its internal data to reflect this fact. There are several reasons why the master participant may not receive a reply packet from the associate master participant. For example, the associate master participant may have failed. As another example, the associate master participant may not have received the handover request packet from the master participant. As yet another example, the associate master participant may have received the handover request packet and sent a reply packet, but the reply packet was never received by the master participant. This may occur, for example, if the associate master participant has moved out of range of the master participant.

The master participant does not necessarily know why a reply packet was not received. Accordingly, in step 352, the master participant then waits to see if the associate master participant assumes the role of the master participant. According to one embodiment of the invention, upon assuming the role of the master participant, the associate master participant notifies all participants by transmitting a broadcast message that will be received by the current master participant.

If, in step 354, the master participant determines that the associate master participant has assumed the role of the master participant, then in step 344, the master participant assumes the role of a slave participant and the process is complete in step 346. According to one embodiment of the invention, the master participant waits a specified amount of time to detect a broadcast message from the associate master. If, in step 354, the associate master participant has not assumed the role of the master participant within a specified period of time, then the master participant retains control and the process is complete in step 346.

FIG. 3C is a flow diagram 370 that depicts an approach for a master participant to request that a slave participant assume the role of associate master participant, according to an embodiment of the invention. In step 372, the master participant hops to the next channel and waits for the master transmission time slot. In step 374, the master participant generates and sends to the slave participant a promotion request packet to request that the slave participant assume the role of associate master participant.

In step 376, the master participant hops to the next channel and waits for a reply packet from the associate master. Note that in this situation, the master participant expects a reply packet from the associate master participant.

In step 378, a determination is made whether the master participant has received a reply packet from the slave participant. If so, then in step 380, the master participant decodes the reply packet. In step 382, the master participant determines, based upon the contents of the reply packet, whether the slave participant has accepted the promotion request and will assume the role of the associate master participant. If a determination is made that the slave participant did accept the promotion request, then in step 384, the master participant updates its internal data to reflect that the slave participant is now the associate master participant. The process is then complete in 386.

If, in step 382, the master participant determines, based upon the contents of the reply packet, that the slave participant has not accepted the promotion request, then in step 388, the reply packet is discarded and the process is complete in step 386.

Returning to step 378, if the master participant does not receive a reply packet from the slave participant, then in step 390, the master updates its internal data to reflect this fact. The slave participant may not have received the promotion request packet from the master participant. Alternatively, the master participant may not have received the reply packet from the slave participant. For example, in the context of mobile devices, the slave participant may have moved out of range of the master participant. The process is then complete in step 386.

4. Associate Master Participants

Associate master participants may be selected according to any technique and the invention is not limited to any particular technique. As previously described herein, the associate master participant takes over as master participant if requested by the master participant or if the associate master participant determines that the master participant is not capable of performing its assigned functions. According to one embodiment of the invention, if the associate master does not detect a data packet from the master participant within a specified period of time, then the associate master participant assumes that the master participant has failed or is out of range and takes over as the master participant. This determination may be made using a variety of techniques depending upon the requirements of a particular application and the invention is not limited to any particular technique. For example, associate participants may employ a timer. When the associate master participant receives the status data from the master participant, the timer is reset. If the status data is not received before expiration of the timer, then the associate master participant assumes the role of the master participant.

Figure 4:
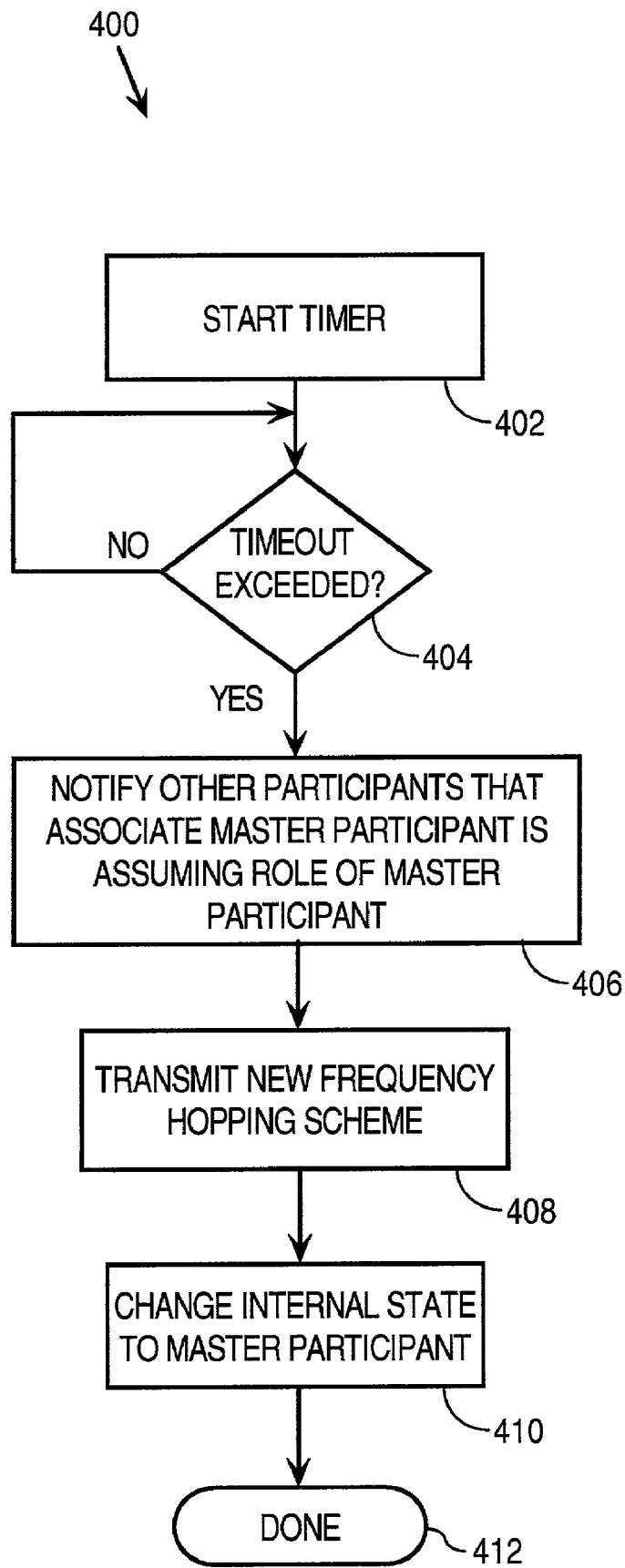
FIG. 4 is a flow diagram that depicts steps performed by an associate master participant using a timeout to determine that the master participant has failed according to an embodiment of the invention.

FIG. 4 is a flow diagram 400 that depicts steps performed by an associate master participant using a timer to determine that the master participant has failed according to an embodiment of the invention. In step 402, the timer is started. In step 404, a determination is made whether a timeout, i.e., a specified period of time, has been exceeded. This may be determined, for example, by comparing a time value from the timer to a specified value. If the time value equals or exceeds the specified value, then the timeout has been exceeded. If the time value is less than the specified value, then control continues in step 404.

Once the timeout has been exceeded, then in step 406, the associate master participant notifies the other participants that it is assuming the role of the master participant. According to one embodiment of the invention, the associate master participant broadcasts a message to all other participants in the master participant time slot to notify the other participants that the associate master participant is assuming the role of the master participant. Other approaches may also be used. For example, the associate master may notify the other participants individually.

In step 408, the associate master participant optionally selects a new frequency hopping scheme and notifies all of the other participants. The associate master participant may alternatively continue to use the current frequency hopping scheme. In step 410, the associate master participant changes its internal state to reflect that it has assumed the role of master participant. The process is complete in step 412.

It should be noted that the approach depicted in FIG. 4 is only one example situation in which an associate master participant assumes the role of master participant. As previously described, for example, an associate master participant may detect that a master participant has failed using other techniques, or the current master participant may request that an associate master participant assume the role of master participant.

5. Slave Participants

Slave participants may employ their own timer mechanisms to determine whether the current master participant is no longer capable of performing its assigned functions. According to one embodiment of the invention, if both the associate master participant and the slave participants use timers, then the timeouts used by the associate master participant is set to a shorter time than the timeouts used by the slave participants, so that the associate master participant will determine before the slave participants that the master participant can no longer perform its assigned functions.

Figure 5:
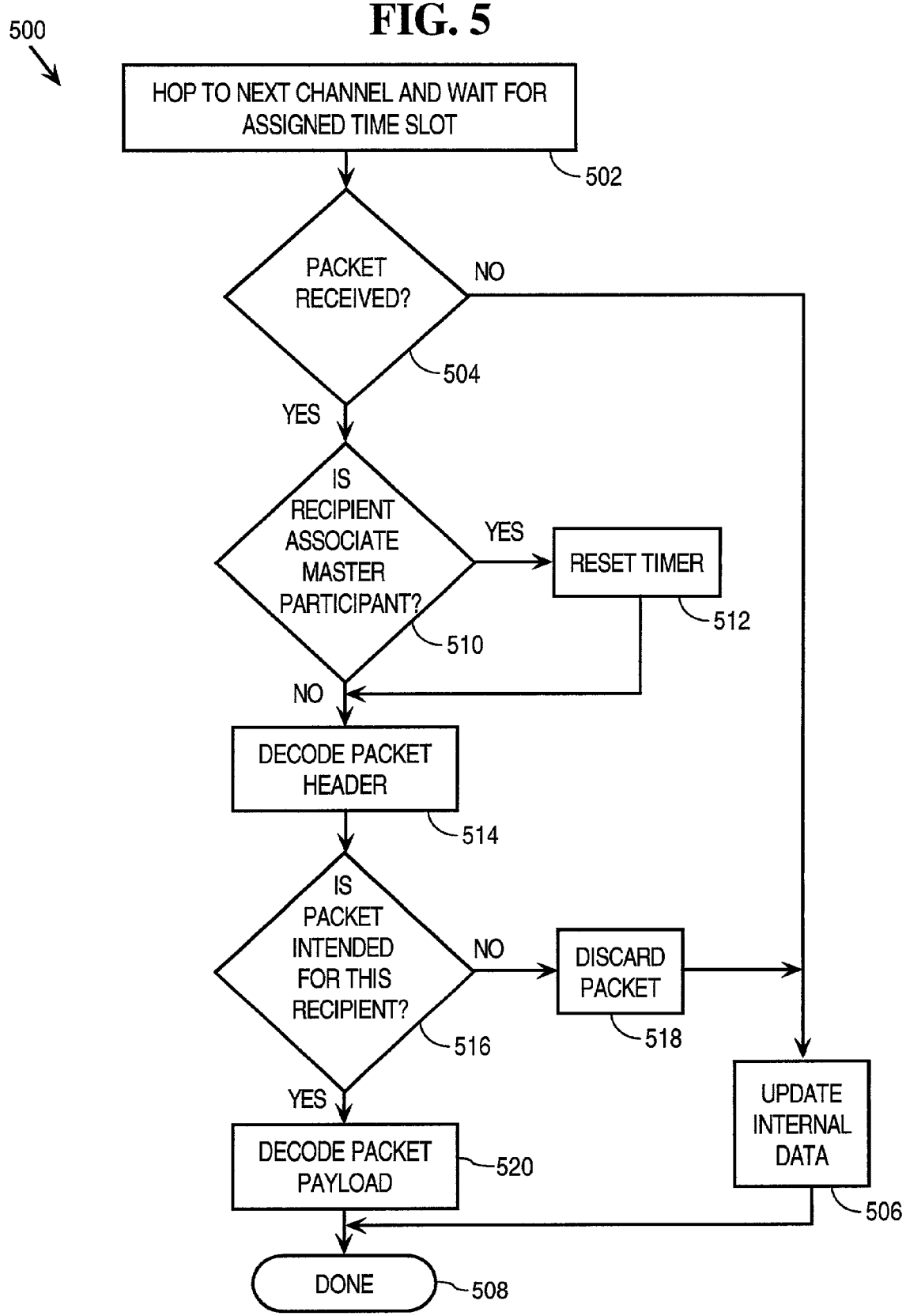
FIG. 5 is a flow diagram that depicts how associate master participants and slave participants communicate with a master participant according to an embodiment of the invention.

6. Communications Between Associate Master Participants and Slave Participants and Master Participants FIG. 5 is a flow diagram 500 that depicts how associate master participants and slave participants communicate with a master participant according to an embodiment of the invention. In step 502, the associate master participant or slave participant hops to the next channel, according to the particular frequency hopping scheme employed, and then waits for their assigned time slot. Once the assigned time slot has arrived, the associate master participant or slave participant attempts to detect an incoming packet from the master participant. In step 504, a determination is made whether a packet has been received. If not, then the associate master participant or slave participant updates its internal data in step 506 and the process is complete in step 508. At this point, the associate master participant or slave participant conventionally repeats steps 502 and 504 until a packet is detected from the master participant.

If in step 504, the associate master participant or slave participant detects a packet from the master participant, then the process proceeds to step 510. If the recipient is an associate master participant, then in step 512, a timer is reset to indicate that the current master participant is still active. In step 514, the header of the received packet is decoded to determine the intended recipient of the packet.

In step 516, a determination is made whether the packet was intended for this recipient. If not, then in step 518, the packet is discarded and in step 506, the associate master participant or slave participant updates its internal data and the process is complete in step 508. If, in step 516, the packet is intended for this recipient, then in step 520, the payload of the packet is decoded. Details of decoding the payload are described in more detail hereinafter. The process is complete in step 508.

Figure 6B:
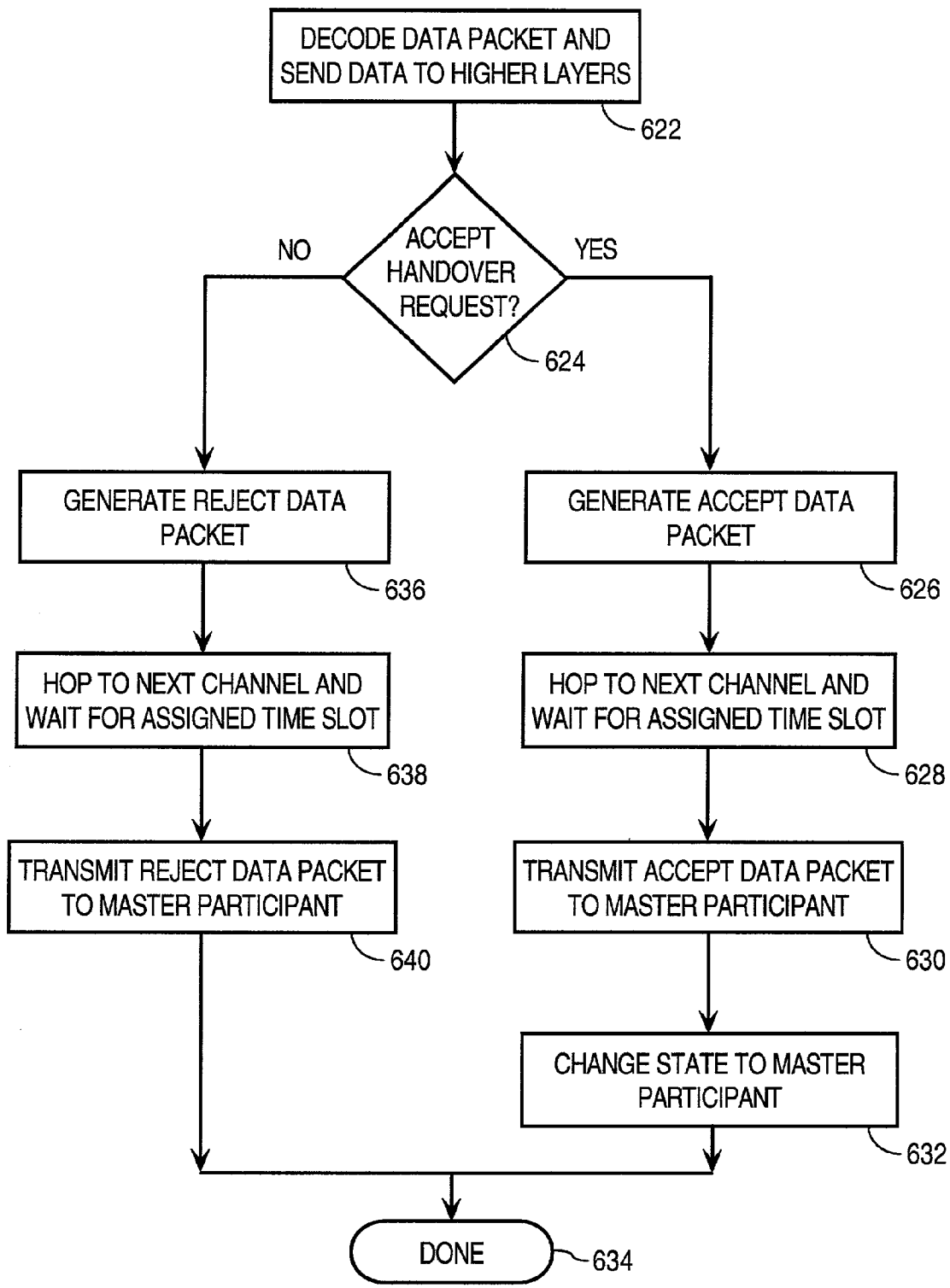
FIG. 6B is a flow diagram that depicts example steps performed by an associate master participant to process a handover request packet from a master participant according to an embodiment of the invention.
Figure 6C:
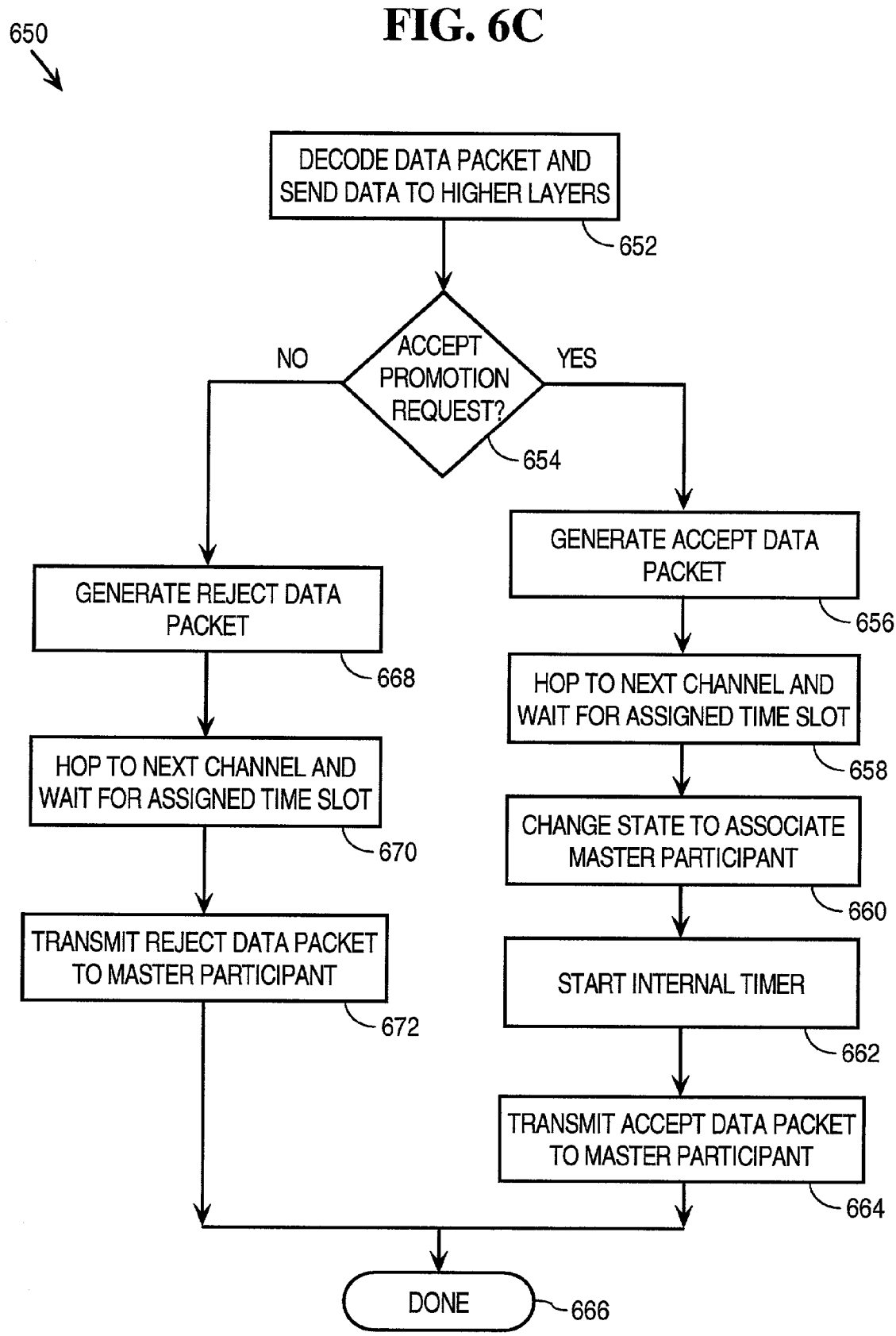
FIG. 6C is a flow diagram that depicts example steps performed by a slave participant to process a promotion request packet from a master participant according to an embodiment of the invention.

FIGS. 6A-6C are flow diagrams that depict how associate master participants and slave participants process three different types of packets received from a master participant. These examples are not meant to be exhaustive and other types of packets may also be used depending upon the requirements of a particular application.

FIG. 6A is a flow diagram 600 that depicts example steps performed by an associate master participant or slave participant to process a data packet received from a master participant. For purposes of explanation, the associate master participant or slave participant receiving and processing the packet is referred to as the recipient participant.

In step 602, the data packet is decoded and data is sent to higher layers in the recipient participant as necessary. For example, in the situation where the recipient participant is a device, the data may include one or more commands to be processed by the device.

In step 604, the recipient participant generates a reply packet. In step 606, the recipient participant hops to the next channel, according to the particular frequency hopping methodology employed, and waits for its assigned time slot. In step 608, the recipient participant transmits the reply packet to the master participant. The process is complete in step 610.

FIG. 6B is a flow diagram 620 that depicts example steps performed by an associate master participant to process a handover request packet from a master participant. In this context, the handover request is a request by the current master participant to an associate master participant for the associate master participant to assume the role of the master participant. In step 622, the associate master participant decodes the handover request packet and sends data to higher levels within the associate master participant device as necessary.

In step 624, the associate master participant determines whether to accept the handover request from the master participant and assume the responsibilities of the master participant. If so, then in step 626, the associate master participant generates an accept data packet. The accept data packet includes data that indicates to the master participant that the associate master participant will accept the role of master participant.

In step 628, the associate master participant hops to the next channel, according to the particular frequency hopping technique employed, and waits for its assigned time slot. In step 630, the associate master participant transmits the accept data packet to the master participant. In step 632, the associate master participant changes its state to assume the role of the master participant and the process is complete in step 634.

If, in step 624, the associate master participant determines to not accept the handover request from the master participant, then in step 636, the associate master participant generates a reject data packet. The reject data packet includes data that indicates to the master participant that the associate master participant will not accept the role of master participant. In step 638, the associate master participant hops to the next channel, according to the particular frequency hopping technique employed, and waits for its assigned time slot. In step 640, the associate master participant transmits the reject data packet to the master participant and the process is complete in step 634.

FIG. 6C is a flow diagram 650 that depicts example steps performed by a slave participant to process a promotion request packet from a master participant. The promotion request packet requests that a slave participant accept a promotion to associate master participant. A master participant may request that a slave participant accept a promotion to associate master participant for several reasons. For example, a master participant may be attempting to designate the first associate master participant, a current associate master participant may have failed, or there may be a need for an additional associate master participant.

In step 652, the associate master participant decodes the handover request packet and sends data to higher levels within the associate master participant device as necessary. In step 654, the slave participant determines whether to accept the promotion request from the master participant and assume the responsibilities of the associate master participant.

If so, then in step 656, the slave participant generates an accept data packet. The accept data packet includes data that indicates to the master participant that the slave participant will accept the role of associate master participant. In step 658, the slave participant hops to the next channel, according to the particular frequency hopping technique employed, and waits for its assigned time slot. In step 660, the slave participant changes its state to assume the role of the associate master participant. In step 662, the former slave participant, having accepted the new role as associate master participant, starts its own internal timer, as previously described herein with respect to associate master participants. In step 664, the slave participant transmits the accept data packet to the master participant and the process is complete in step 666. The order of steps 656-664 may vary depending upon the requirements of a particular application and the invention is not limited to any particular order of performing these steps. For example, in a particular application, step 662 may be performed prior to step 660.

If, in step 654, the slave participant determines to not accept the promotion request from the master participant, then in step 668, the slave participant generates a reject data packet. The reject data packet includes data that indicates to the master participant that the slave participant will not accept the role of associate master participant. In step 670, the slave participant hops to the next channel, according to the particular frequency hopping technique employed, and waits for its assigned time slot. In step 672, the slave participant transmits the reject data packet to the master participant and the process is complete in step 666.

7. Implementation Mechanisms

The approach for transferring management functions between participants may be implemented in a wide variety of network types and contexts. For example, the approach may be implemented in any type of communications network, with or without the use of frequency hopping, and in networks that employ frequency hopping, any type of frequency hopping scheme. The approach may also be implemented with any type of network participants. For example, the approach may be implemented in wire-based networks or in wireless networks, where the participants are mobile devices.

Figure 7:
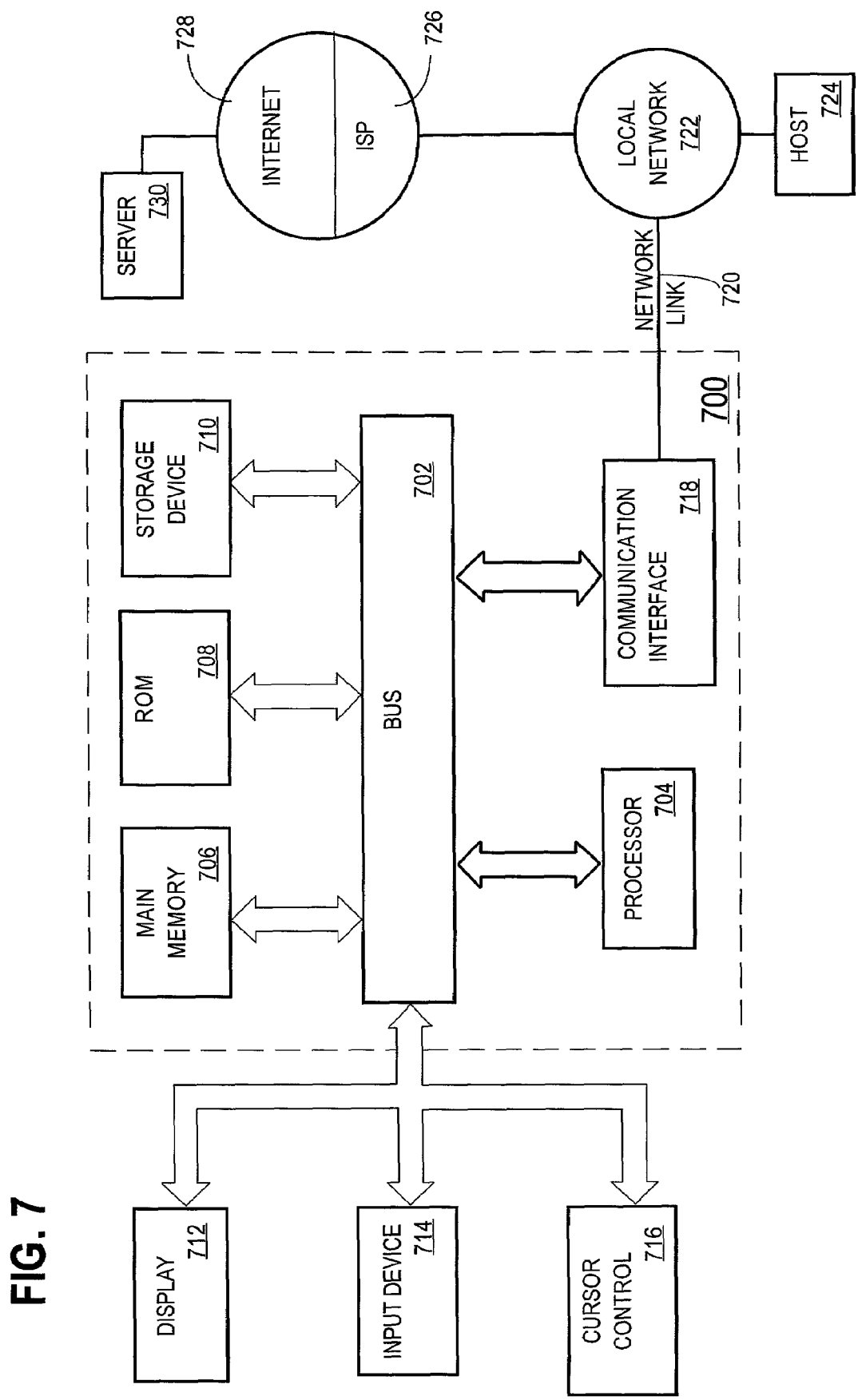
FIG. 7 is a block diagram of a computer system on which embodiments may be implemented.

FIG. 7 is a block diagram that depicts a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for managing network communications using adaptive network control. According to one embodiment of the invention, managing network communications using adaptive network control is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hardware circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for managing network communications using adaptive network control as described herein.

The received code may be executed by processor 704 as it is received, and/or stored in storage device 710, or other non-volatile storage for later execution. In this manner, computer system 700 may obtain application code in the form of a carrier wave.

The approach described herein for managing communications networks using adaptive network control provides several advantages over prior approaches for managing communications networks. Conventional recovery approaches first require that the slave participants determine that the master has failed. This typically occurs when one or more slave participants do not receive an expected response from the master participant and the conclusion is made that the master participant must have failed. This may require a substantial amount of time in situations where the slave participants do not expect a response from the master participant. Once a determination is made that the master participant has failed, a new master participant must be elected from the available slave participants. Thus, conventional approaches require substantially more time to recover from the failure of a master participant.

With the present approach, an associate master participant is designated shortly after the network is up and running. Assuming that an associate master participant is designated prior to a failure of the current master participant, then when a failure of the current master participant occurs, the interruptions in network communications are significantly reduced. First, since the associate master participant is assigned the task of monitoring the master participant, a failure of the master participant is determined more quickly. The timeout used by the associate master participant may be selected depending upon the requirements of a particular application to optimize recovery.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A computer-implemented method for assigning functions between participants in a communications arrangement comprising a plurality of participants, the method comprising the steps of:

assigning, to a first participant from the plurality of participants, one or more functions to be performed by the first participant;

prior to a failure of the first participant that prevents the first participant from performing any of the one or more functions assigned to the first participant:

designating a second participant from the plurality of participants to perform the one or more functions if any of one or more handoff criteria are satisfied;

the first participant communicating directly with the second participant to indicate that the second participant has been designated to perform the one or more functions if any of the one or more handoff criteria are satisfied;

the first participant performing the one or more functions; and the second participant not performing the one or more functions;

in response to any of the one or more handoff criteria being satisfied:

assigning the one or more functions to the second participant; and the second participant performing the one or more functions instead of the first participant performing the one or more functions.

2. The computer-implemented method as recited in claim 1, further comprising:

unassigning the one or more functions from the first participant, in response to any of the one or more handoff criteria being satisfied; and wherein the first participant communicating directly with the second participant to indicate that the second participant has been designated to perform the one or more functions if any of the one or more handoff criteria are satisfied further comprises the first participant communicating directly with the second participant via a single wireless connection between the first participant and the second participant to indicate that the second participant has been designated to perform the one or more functions if any of the one or more handoff criteria are satisfied.

3. The computer-implemented method as recited in claim 1, further comprising:

prior to a failure of the second participant that prevents the second participant from performing any of the one or more functions assigned to the second participant, designating a third participant from the plurality of participants to perform the one or more functions if any of one or more handoff criteria are satisfied; and in response to any of the one or more handoff criteria being satisfied, assigning the one or more functions to the third participant, and unassigning the one or more functions from the second participant.

4. The computer-implemented method as recited in claim 1, wherein:

the one or more functions include initiating and controlling communications between the plurality of participants; and communications between the plurality of participants are made using a frequency hopping sequence according to a frequency hopping protocol.

5. The computer-implemented method as recited in claim 1, wherein the steps of designating the second participant, the first participant communicating directly with the second participant, the first participant performing the one or more functions, and the second participant not performing the one or more functions occur during a time period that begins with assigning the one or more functions to the first participant and ends with any of the one or more handoff criteria being satisfied.

6. The computer-implemented method as recited in claim 1, wherein the communications arrangement is a wireless communications arrangement and at least one of the first participant and the second participant is a mobile device.

7. The computer-implemented method as recited in claim 1, wherein the one or more handoff criteria include at least one criterion that is selected from the group consisting of a request from the first participant, the first participant not communicating within a specified amount of time, a failure of the first participant, the first participant being out of range of one or more other participants from the plurality of participants, and a power level of the first participant falling below a specified threshold.

8. The computer-implemented method as recited in claim 1, wherein:
the first participant is a master participant,
the second participant is a slave participant prior to being assigned to perform the one or more functions, and
the second participant is an associate master participant after being designated to perform the one or more functions if any of the one or more handoff criteria are satisfied.

9. The computer-implemented method as recited in claim 1, wherein the second participant is designated by the first participant.

10. The computer-implemented method as recited in claim 1, wherein the second participant is designated by one or more participants from the plurality of participants other than the first participant.

11. The computer-implemented method as recited in claim 1, wherein the first participant communicating directly with the second participant to indicate that the second participant has been designated to perform the one or more functions if any of the one or more handoff criteria are satisfied further comprises the steps of:
the first participant sending a first packet directly to the second participant to indicate that the second participant has been designated to perform the one or more functions if any of the one or more handoff criteria are satisfied; and
the first participant receiving a second packet directly from the second participant to indicate that the second participant accepts being designated to perform the one or more functions if any of the one or more handoff criteria are satisfied.

12. The computer-implemented method as recited in claim 11, wherein assigning the one or more functions to the second participant, in response to any of the one or more handoff criteria being satisfied, further comprises the steps of:
the first participant sending a third packet directly to the second participant to indicate that the second participant is to perform the one or more functions; and
the first participant receiving a fourth packet directly from the second participant to indicate that the second participant accepts responsibility for performing the one or more functions.

13. The computer-implemented method as recited in claim 1, wherein
the one or more handoff criteria include expiration of a timer;
the second participant starts the timer in response to the first participant communicating directly with the second participant;
the second participant restarts the timer each time the first participant communicates with the second participant; and
the timer expires when the first participant does not communicate with the second participant for a specified amount of time.

14. The computer-implemented method as recited in claim 1, wherein the one or more functions are one or more management functions.

15. A computer-readable storage medium carrying one or more sequences of one or more instructions for assigning functions between participants in a communications arrangement, the one or more sequences of one or more instructions including instructions which, when executed by one or more processor, cause the one or more processor to perform the step of:
assigning, to a first participant from the plurality of participants, one or more functions to be performed by the first participant;
prior to a failure of the first participant that prevents the first participant from performing any of the one or more functions assigned to the first participant:
designating a second participant from the plurality of participants to perform the one or more functions if any one or more handoff criteria are satisfied;
the first participant communicating directly with the second participant to indicate that the second participant has been designated to perform the one or more functions if any of the one or more handoff criteria are satisfied;
the first participant performing the one or more functions; and
the second participant not performing the one or more functions;
in response to any of the one or more handoff criteria being satisfied:
assigning the one or more functions to the second participant; and
the second participant performing the one or more functions instead of the first participant performing the one or more function.

16. The computer-readable storage medium as recited in claim 15, further comprising:
one or more sequences of additional instructions which, when executed by the one or more processors, cause the one or more processors to unassign the one or more functions from the first participant, in response to any of the one or more handoff criteria being satisfied; and
wherein the instructions for the first participant communicating directly with the second participant to indicate that the second participant has been designated to perform the one or more functions if any of the one or more handoff criteria are satisfied further comprises one or more sequences of one or more instructions including instructions which, when executed by one or more processors, cause the one or more processors to perform the step of the first participant communicating directly with the second participant via a single wireless connection between the first participant and the second participant to indicate that the second participant has been designated to perform the one or more functions if any of the one or more handoff criteria are satisfied.

17. The computer-readable storage medium as recited in claim 15, further comprising one or more sequences of additional instructions which, when executed by the one or more processors, cause the one or more processors to prior to a failure of the second participant that prevents the second participant from performing any of the one or more functions assigned to the second participant, designating a third participant from the plurality of participants to perform the one or more functions if any of one or more handoff criteria are satisfied; and
in response to any of the one or more handoff criteria being satisfied, assigning the one or more functions to the third participant, and unassigning the one or more functions from the second participant.

18. The computer-readable storage medium as recited in claim 15, wherein:
the one or more functions include initiating and controlling communications between the plurality of participants; and
communications between the plurality of participants are made using a frequency hopping sequence according to a frequency hopping protocol.

19. The computer-readable storage medium as recited in claim 15, wherein the steps of designating the second participant, the first participant communicating directly with the second participant, the first participant performing the one or more functions, and the second participant not performing the one or more functions occur during a time period that begins with assigning the one or more functions to the first participant and ends with any of the one or more handoff criteria being satisfied.

20. The computer-readable storage medium as recited in claim 15, wherein the communications arrangement is a wireless communications arrangement and at least one of the first participant and the second participant is a mobile device.

21. The computer-readable storage medium as recited in claim 15, wherein the one or more handoff criteria include at least one criterion that is selected from the group consisting of a request from the first participant, the first participant not communicating within a specified amount of time, a failure of the first participant, the first participant being out of range of one or more other participants from the plurality of participants, and a power level of the first participant falling below a specified threshold.

22. The computer-readable storage medium as recited in claim 15, wherein:
the first participant is a master participant, the second participant is a slave participant prior to being assigned to perform the one or more functions, and
the second participant is an associate master participant after being designated to perform the one or more functions if any of the one or more handoff criteria are satisfied.

23. The computer-readable storage medium as recited in claim 15, wherein the second participant is designated by the first participant.

24. The computer-readable storage medium as recited in claim 15, wherein the second participant is designated by one or more participants from the plurality of participants other than the first participant.

25. The computer-readable storage medium as recited in claim 15, wherein the instructions for the first participant communicating directly with the second participant to indicate that the second participant has been designated to perform the one or more functions if any of the one or more handoff criteria are satisfied further comprises one or more sequences of one or more instructions including instructions which, when executed by one or more processors, cause the one or more processors to perform the steps of:
the first participant sending a first packet directly to the second participant to indicate that the second participant has been designated to perform the one or more functions if any of the one or more handoff criteria are satisfied; and
the first participant receiving a second packet directly from the second participant to indicate that the second participant accepts being designated to perform the one or more functions if any of the one or more handoff criteria are satisfied.

26. The computer-readable storage medium as recited in claim 25, wherein the instructions for assigning the one or more functions to the second participant, in response to any of the one or more handoff criteria being satisfied, further comprising one or more sequences of one or more instructions including instructions which, when executed by one or more processors, cause the one or more processors to perform the steps of:
the first participant sending a third packet directly to the second participant to indicate that the second participant is to perform the one or more functions; and
the first participant receiving a fourth packet directly from the second participant to indicate that the second participant accepts responsibility for performing the one or more functions.

27. The computer-readable storage medium as recited in claim 15, wherein
the one or more handoff criteria include expiration of a timer;
the second participant starts the timer in response to the first participant communicating directly with the second participant;
the second participant restarts the timer each time the first participant communicates with the second participant; and
the timer expires when the first participant does not communicate with the second participant for a specified amount of time.

28. The computer-readable storage medium as recited in claim 15, wherein the one or more functions are one or more management functions.

29. A communications device comprising:
an interface configured to receive data from a plurality of communications devices and to transmit data to the plurality of communications devices; and
a mechanism communicatively coupled to the interface and configured to:
perform one or more functions; and
prior to a failure of the communications device that prevents the communications device from performing any of the one or more functions:
designate a particular communications device from the plurality of communications devices to perform the one or more functions if any of one or more handoff criteria are satisfied; and
communicate directly with the particular communications device to indicate that the particular communications device has been designated to perform the one or more functions if any of the one or more handoff criteria are satisfied;
perform the one or more functions; and
wherein the particular communications device does not perform the one or more functions;
wherein, in response to any of the one or more handoff criteria being satisfied, the particular communications device performs the one or more functions instead of the communications device performing the one or more functions.

30. The communications device as recited in claim 29, wherein:
the one or more functions include initiating and controlling communications between the plurality of communications devices; and communications between the plurality of communications devices are made using a frequency hopping sequence according to a frequency hopping protocol.

31. The communications device as recited in claim 29, wherein the communications device is a wireless communications device and at least one of the communications device and the particular communications device is a mobile device.

32. The communications device as recited in claim 29, wherein the one or more handoff criteria include at least one criterion that is selected from the group consisting of a request from the communications device, the communications device not communicating within a specified amount of time, a failure of the communications device, the communications device being out of range of one or more other communications devices from the plurality of communications devices, and a power level of the communication device falling below a specified threshold.

33. The communications device as recited in claim 29, wherein:
the communications device is a master participant;
the particular communications device is a slave participant prior to performing the one or more functions; and
the particular communications device is an associate master participant after being designated to perform the one or more functions if any of the one or more handoff criteria are satisfied.

34. The communications device as recited in claim 29, wherein:
the mechanism is further configured to not perform the one or more functions, in response to any of the one or more handoff criteria being satisfied; and
the mechanism being configured to communicate directly with the particular communications device to indicate that the particular communications device has been designated to perform the one or more functions if any of the one or more handoff criteria are satisfied further comprises the mechanism being configured to communicate directly with the particular communications device via a single wireless connection between the communications device and the particular communications device to indicate that the particular communications device has been designated to perform the one or more functions if any of the one or more handoff criteria are satisfied.

35. The communications device as recited in claim 29, wherein:
prior to a failure of the particular communications device that prevents the particular communications device from performing any of the one or more functions assigned to the particular communications device, an additional communications device from the plurality of communications devices is designated to perform the one or more functions if any of one or more handoff criteria are satisfied;
in response to any of the one or more handoff criteria being satisfied,
the one or more functions are performed by the additional communications device, and
the one or more functions are no longer performed by the particular communications device.

36. The communications device as recited in claim 29, wherein the mechanism is configured to designate the particular communications device, communicate directly with the particular communications device, perform the one or more functions, and the particular communications device does not perform the one or more functions during a time period that begins with the mechanism starting to perform the one or more functions and ends with any of the one or more handoff criteria being satisfied.

37. The communications device as recited in claim 29, wherein the mechanism designating the particular communications device is based on the mechanism selecting the particular communications device.

38. The communications device as recited in claim 29, wherein the mechanism designating the particular communications device is based on one or more communications devices from the plurality of communications devices, other than the communications device, selecting the particular communications device.

39. The communications device as recited in claim 29, wherein the mechanism being configured to communicate directly with the particular communications device to indicate that the particular communications device has been designated to perform the one or more functions if any of the one or more handoff criteria are satisfied further comprises the mechanism being configured to:
send a first packet directly to the particular communications device to indicate that the particular communications device has been designated to perform the one or more functions if any of the one or more handoff criteria are satisfied; and
receive a second packet directly from the particular communications device to indicate that the particular communications device accepts being designated to perform the one or more functions if any of the one or more handoff criteria are satisfied.

40. The communications device as recited in claim 39, wherein the particular communications device performing the one or more functions, in response to any of the one or more handoff criteria being satisfied, further comprises the mechanism being configured to:
send a third packet directly to the particular communications device to indicate that the particular communications device is to perform the one or more functions; and
receive a fourth packet directly from the particular communications device to indicate that the particular communications device accepts responsibility for performing the one or more functions.

41. The communications device as recited in claim 29, wherein the one or more handoff criteria include expiration of a timer;
the particular communications device starts the timer in response to the communications device communicating directly with the particular communications device;
the particular communications device restarts the timer each time the communications device communicates with the particular communications device; and
the timer expires when the communications device does not communicate with the particular communications device for a specified amount of time.

42. The communications device as recited in claim 29, wherein the one or more functions are one or more management functions.

* * * * *